May 3, 1949. H. P. BROWN 2,469,152
TRAILER DOLLY
Filed July 10, 1946 3 Sheets-Sheet 1
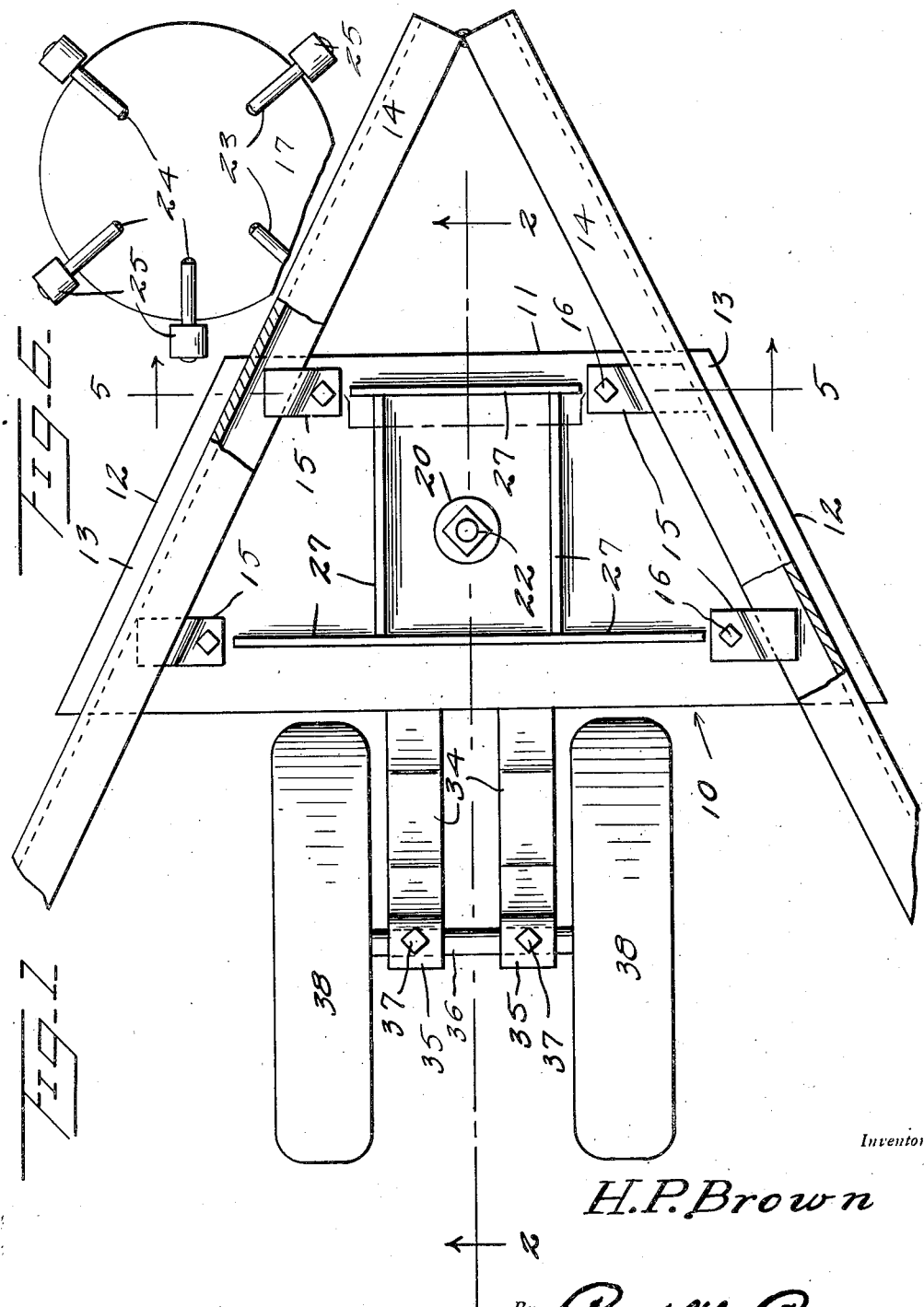
Inventor
H. P. Brown
By Randolph & Beavers
Attorneys May 3, 1949. H. P. BROWN 2,469,152
TRAILER DOLLY
Filed July 10, 1946 3 Sheets-Sheet 2
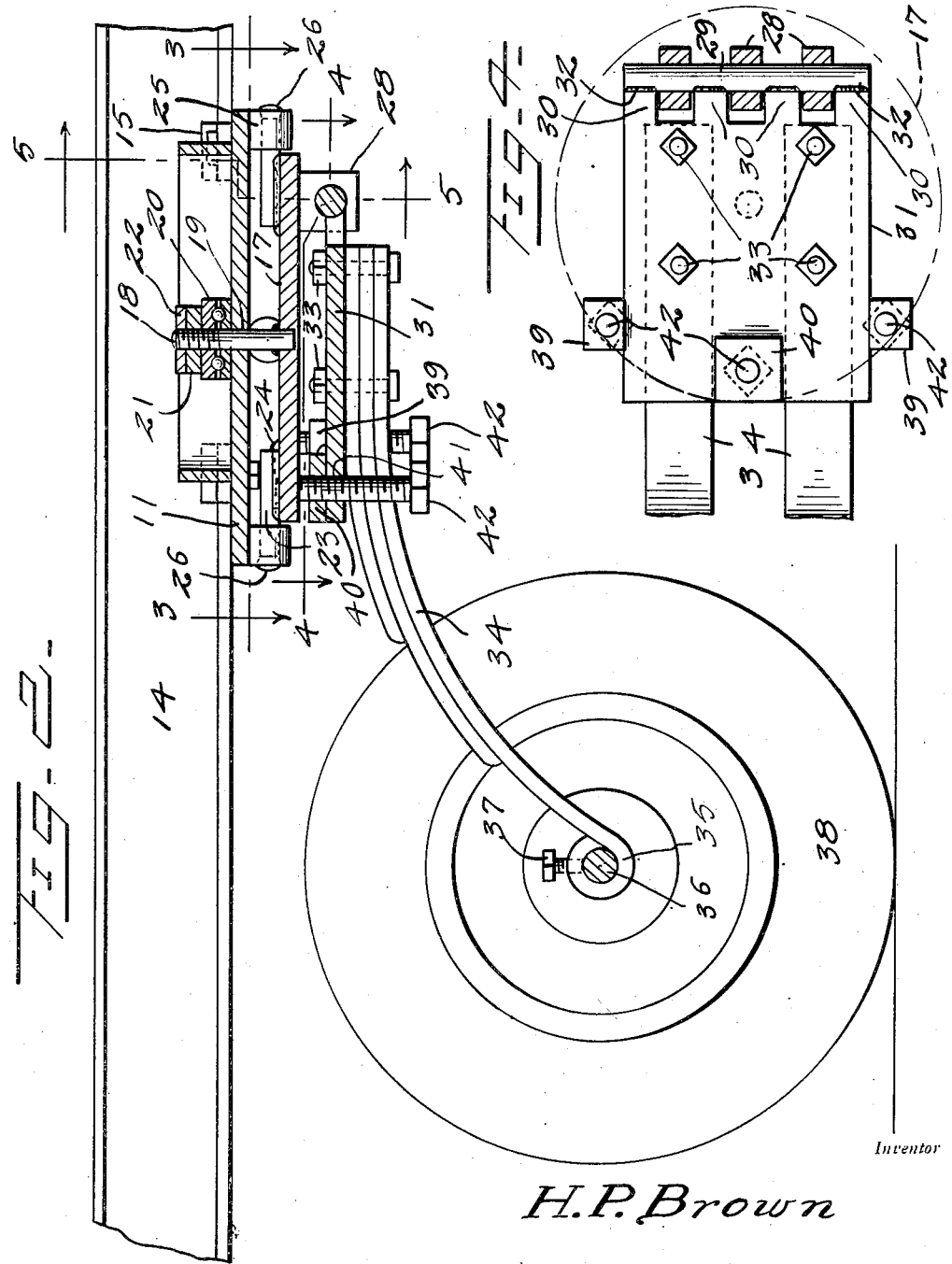
Inventor
H. P. Brown
By Randolph & Beavers
Attorneys

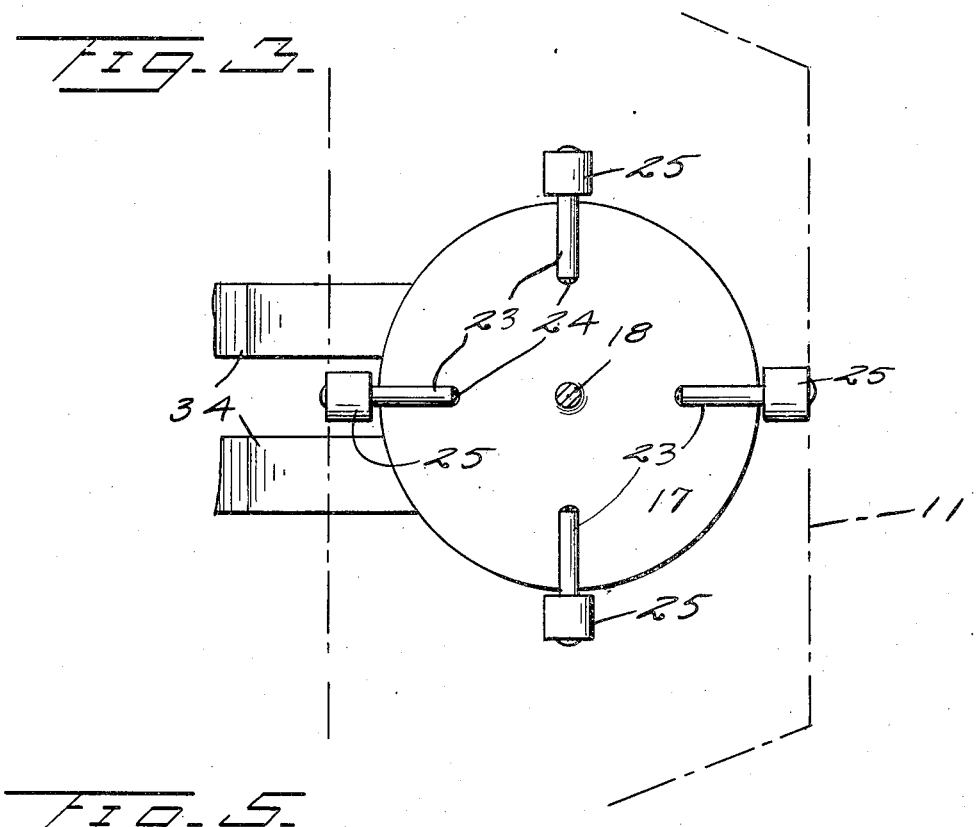
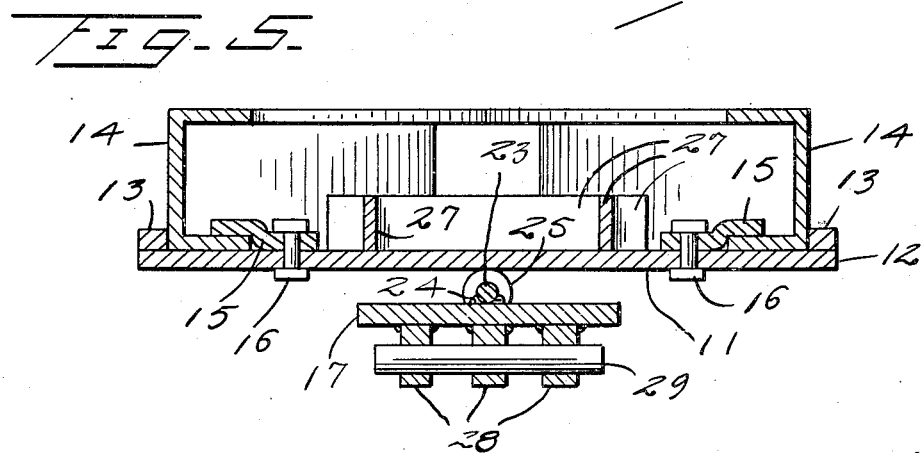

Patented May 3, 1949

2,469,152

UNITED STATES PATENT OFFICE 2,469,152

TRAILER DOLLY

Howard Payton Brown, Meridian, Miss.

Application July 10, 1946, Serial No. 682,649

7 Claims. (Cl. 16—44)

This invention relates to a novel construction of dolly or truck especially adapted for use in supporting the forward end of a trailer, and which is especially intended for use in supporting the forward end of a house trailer.

More particularly, it is an object of the present invention to provide a dolly which is especially constructed and arranged to be attached to the frame or chassis at the forward end of a house trailer and which includes a pair of ground engaging, pneumatic tired wheels yieldably mounted by the dolly relatively to the trailer for cushioning road shocks which would normally be transmitted to the forward end thereof.

A further object of the invention is to provide a dolly wherein the ground engaging wheels are swivelly supported with respect to a trailer mounted thereon to enable the dolly to swivel into any position to facilitate the moving of the trailer.

Still a further and important object of the invention is to provide a trailer dolly having adjustable hinge means interposed between the ground wheels thereof and the trailer supported thereby for raising and lowering said ground wheels to adapt the dolly to trailer chassis of different heights and to enable leveling of the trailer after attachment of the dolly thereto.

Numerous other objects and advantages of the invention will hereinafter become more fully apparent from the following description of the drawings, which illustrate a preferred embodiment thereof, and wherein:

Figure 1 is a top plan view illustrating a preferred embodiment of the trailer dolly shown applied to the forward part of the frame or chassis of a trailer;

Figure 2 is a longitudinal, vertical sectional view thereof taken substantially along a plane as indicated by the line 2—2 of Figure 1;

Figure 3 and Figure 4 are horizontal sectional views taken substantially along planes as indicated by the lines 3—3 and 4—4, respectively, of Figure 2;

Figure 5 is a transverse vertical sectional view taken substantially along planes as indicated by the lines 5—5 of Figures 1 and 2, and Figure 6 is a fragmentary plan view of another form of the upper hinge plate.

Referring more specifically to the drawings, the trailer dolly in its entirety is designated generally 10 and includes an elongated plate or platform 11 which is preferably formed of metal and of sufficient strength to sustain the weight of an end of a trailer. The plate or platform 11 is provided with corresponding converging ends 12 having upstanding flanges 13, as best seen in Figure 5, to engage against the outer sides of a pair of converging beams 14 which form the forward end of the frame or chassis of a trailer, such as a house trailer, not shown. The frame beams 14 are channel shaped and are arranged to open inwardly and are disposed in forwardly converging relationship, as clearly illustrated in Figure 1. The plate or platform 11 is provided with a plurality of brackets 15, a plurality of which are located adjacent each end thereof and on the upper side of the plate. The brackets 15 are each detachably fastened at their inner ends by a fastening 16 to the plate 11 and are provided with upwardly off-set outer ends which engage over the upper sides of the lower flanges of the channel beams 14 and which are retained in clamping engagement therewith by the fastening 16. The brackets 15 provide the sole means of attaching the dolly 10 to the trailer frame or chassis and it will therefore be readily apparent that the dolly may be quickly applied or removed and will be effectively retained by the brackets 15 and flanges 13 in engagement with the beams 14. An upper hinge plate 17 is disposed beneath the central portion of the plate or platform 11 and is provided with an upwardly extending king bolt 18, which is suitably fixed thereto as by welding and which extends through and is journaled in a substantially centrally disposed opening 19 of the plate 11 and an anti-friction bearing 20 which is disposed on the upper side of the plate 11. The upper end of the king bolt 18 is threaded to receive a nut 21 and a lock nut 22 which are disposed above the bearing 20 and by means of which the upper hinge plate 17 is detachably retained in engagement with the platform or plate 11. As best seen in Figure 3, the upper hinge plate 17 is substantially disk shaped and is provided with a plurality of axles or shafts 23 each of which is welded or otherwise suitably secured thereto, as indicated at 24. The axles or shafts 23 are each provided with an outer end which projects beyond the periphery of the disk or plate 17 and on each of said exposed ends a roller 25 is journaled. The outer ends of the axles or shafts 23 are flared, as indicated at 26 in Figure 2, to retain the rollers 25 in rotatable engagement therewith. As best seen in Figures 1 and 2, the plate 11 is provided with upstanding flanges 27 which are disposed around the upper portion of the king pin 18, bearing 20 and the nuts 21 and 22 to form an enclosure for protecting said parts.

The upper hinge plate 17 is provided with depending apertured lugs 28 located adjacent the forward part thereof and which are disposed in spaced apart, transverse alignment to form hinge barrels for receiving a hinge pin 29 which is connected to laterally spaced extensions or lugs 30, forming one end of the lower hinge plate 31. The lugs 30 are preferably rigidly connected as by welding at 32 to spaced portions of the hinge pin 29, between and on the outer sides of the hinge barrels 28 and said lugs 30 are disposed in substantially the same plane as the remainder of the lower hinge plate 31.

The hinge plate 31 is provided with a plurality of openings to receive nut and bolt fastenings 33 which extend through the inner ends of a pair of leaf springs 34 which are thus detachably secured to the underside of the hinge plate 31. The leaf springs 34 are arcuate in shape and extend rearwardly and downwardly relatively to the hinge plate 31 and are provided with eyes 35 in their lower, free ends to receive an axle 36 which is detachably keyed to the eyes 35 by set screws 37. As best seen in Figure 1, the leaf springs 34 are disposed in laterally spaced apart relationship and the axle 36 extends through the eyes 35 thereof and therebeyond and a ground engaging wheel 38, provided with a pneumatic tire, is journaled on each end of the axle 36. The lower hinge plate 31 is provided with a pair of lugs 39 which project laterally from the side edges thereof, and adjacent its free end, as best seen in Figure 4. The lugs 39 have portions which project above the upper surface of the hinge plate 31 and said hinge plate is also provided with an upstanding portion 40 at its free end and intermediate of its side edges. The lugs 39 and the portion 40 are provided with threaded bores 41 for receiving bolts 42, the threaded shanks of which extend upwardly therethrough to function as set screws by engagement with the under side of the upper hinge plate 17.

Assuming that the trailer dolly 10 is fastened to the frame beams 14 by the brackets 15, as previously described, it will be readily apparent that the front end of a trailer, not shown, beneath which the dolly or truck 10 is disposed will be supported thereby and that the leaf springs 34 will resiliently support the forward end of the trailer. To adapt the dolly or truck 10 to trailers already in use, the hinge construction 17, 31 is provided and it will be obvious that by adjusting the bolts 42 that the lower hinge plate 31 can be moved toward or away from the upper hinge plate 17 to vary the height of the forward end of the trailer, supported thereby, to thereby level trailers having different size rear wheels. The swivel connection between the hinge structures 17, 31 and the plate or platform 11, which is rigidly secured to the trailer frame beams 14, will permit the wheels 38 and their supports to swivel freely relatively to the front end of the trailer frame to facilitate the sharp turning of the trailer and the backing thereof, when attached to a draft vehicle, due to the fact that the pair of wheels 38 may be revolved beneath the frame beams 14 in the same manner as a caster. Further, the king bolt 18 with its anti-friction bearing 20 and the rollers 25, which engage the underside of the plate 11, will enable the hinge structures 17, 31 to revolve freely relatively to the plate 11, regardless of the weight supported by the wheels 38 and springs 34.

Various modifications and changes are contemplated and may obviously be resorted to, without departing from the spirit and scope of the invention as hereinafter defined by the appended claims.

I claim:

1. In a trailer dolly or truck, a base plate adapted to be secured to a trailer frame or chassis, a spring support formed of swingably connected hinge sections, one of the hinge sections being secured to said base plate and disposed therebeneath, a leaf spring secured at one end to the other hinge section and projecting outwardly and downwardly therefrom, said last mentioned hinge section being disposed beneath the first mentioned hinge section, an axle keyed to the opposite, free end of said spring and adapted to journal a ground engaging wheel thereon.

2. A dolly or truck as in claim 1, and means for angularly adjusting the lower hinge section relatively to the base plate for raising or lowering the chassis frame relatively to the ground wheel.

3. A dolly or truck as in claim 1, said spring support being swivelly mounted relatively to the base plate, and means for angularly adjusting the lower hinge section relatively to the base plate for raising or lowering the chassis frame relatively to the ground wheel.

4. In a trailer dolly or truck, a base plate adapted to be detachably secured to a trailer frame, a spring support disposed beneath and connected to the base plate, a pair of leaf springs secured to the spring support and projecting outwardly and downwardly therefrom, an axle keyed to the free ends of said springs and adapted to journal a ground engaging wheel thereon, said spring support comprising a leaf hinge including an upper hinge leaf or plate connected to the base plate and a lower hinge leaf or plate connected to said spring, and means for adjustably spacing the hinge plates for varying the elevation of the trailer frame relatively to the ground wheel.

5. In a trailer dolly or truck, a base plate adapted to be detachably secured to a trailer frame, a spring support disposed beneath and connected to the base plate, a pair of leaf springs secured to the spring support and projecting outwardly and downwardly therefrom, an axle keyed to the free ends of said springs and adapted to journal a ground engaging wheel thereon, said spring support being swivelly connected to the base plate and being provided with rollers or wheels for bearing engagement with the under side of the base plate to facilitate the swivel movement of the spring support relatively thereto.

6. In a trailer dolly or truck, a base plate adapted to be detachably secured to a trailer frame, a spring support disposed beneath and connected to the base plate, a pair of leaf springs secured to the spring support and projecting outwardly and downwardly therefrom, an axle keyed to the free ends of said springs and adapted to journal a ground engaging wheel thereon, said spring support comprising a leaf hinge including an upper hinge leaf or plate connected to the base plate and a lower hinge leaf or plate connected to said spring, and means for adjustably spacing the hinge plates for varying the elevation of the trailer frame relatively to the ground wheel, the hinge pin of said hinge leaves or plates being downwardly off-set relatively to the upper hinge plate for spacing the lower hinge plate therefrom.

7. In a trailer dolly or truck, a base plate adapted to be detachably secured to a trailer frame, a spring support disposed beneath and connected to the base plate, a pair of leaf springs secured to the spring support and projecting outwardly and downwardly therefrom, an axle keyed to the free ends of said springs and adapted to journal a ground engaging wheel thereon, said spring support comprising a leaf hinge including an upper hinge leaf or plate connected to the base plate and a lower hinge leaf or plate connected to said spring, and means for adjustably spacing the hinge plates for varying the elevation of the trailer frame relatively to the ground wheel, said spring support being swivelly connected to the base plate and being provided with rollers or wheels for bearing engagement with the under side of the base plate to facilitate the swivel movement of the spring support relatively thereto.

HOWARD PAYTON BROWN.

REFERENCES CITED

The following references are of record in the file of this patent:

UNITED STATES PATENTS

| Number | Name | Date |
| --- | --- | --- |
| Re. 18,467 | Deisler | May 17, 1932 |
| 539,080 | Ordway | May 14, 1895 |
| 634,974 | Baker | Oct. 17, 1899 |

FOREIGN PATENTS

| Number | Country | Date |
| --- | --- | --- |
| 450,893 | Great Britain | July 27, 1936 |